United States Patent
Duerk et al.

(10) Patent No.: US 7,221,531 B2
(45) Date of Patent: May 22, 2007

(54) STAGGERED SPIN-UP DISABLE MECHANISM

(75) Inventors: Vicky P. Duerk, Shrewsbury, MA (US); Nai-Chih Chang, Shrewsbury, MA (US); Pak-lung Seto, Shrewsbury, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/224,378

(22) Filed: Sep. 12, 2005

(65) Prior Publication Data

US 2007/0058279 A1    Mar. 15, 2007

(51) Int. Cl.
*G11B 19/02* (2006.01)
*G06F 1/00* (2006.01)

(52) U.S. Cl. .................. 360/69; 713/300; 711/114; 703/25

(58) Field of Classification Search ............ None
See application file for complete search history.

(56) References Cited

U.S. PATENT DOCUMENTS

| | | | |
|---|---|---|---|
| 6,408,394 B1 * | 6/2002 | Vander Kamp et al. | 713/300 |
| 2003/0115413 A1 * | 6/2003 | Wood et al. | 711/114 |
| 2003/0212857 A1 * | 11/2003 | Pacheco et al. | 711/114 |
| 2005/0149314 A1 * | 7/2005 | Looi et al. | 703/25 |
| 2005/0185374 A1 * | 8/2005 | Wendel et al. | 361/685 |
| 2005/0289364 A1 * | 12/2005 | Strong et al. | 713/300 |

\* cited by examiner

*Primary Examiner*—Andrew L. Sniezek
(74) *Attorney, Agent, or Firm*—Blakely, Sokoloff, Taylor & Zafman LLP

(57) ABSTRACT

According to one embodiment, a system is disclosed. The system includes one or more storage devices, a host bus adapter (HBA) and a bridging device coupled between the one or more storage device and the HBA. The bridging device includes a register having bits corresponding to each of the one or more storage devices. Each bit indicates whether staggered spin-up is enabled at a corresponding storage device.

18 Claims, 4 Drawing Sheets

STAGGERED SPIN-UP DISABLE MECHANISM

FIELD OF THE INVENTION

The present invention relates to computer systems; more particularly, the present invention relates to computer system interaction with hard disk storage devices.

BACKGROUND

Most of the power used by modern hard disk drives is consumed by the spindle motor. When the hard disk is initially started up, the motor may draw a peak level of power that is more than two times what it takes to keep the disk spinning. While in most cases even the peak start-up power usage is not substantial, there may be an issue when using multiple hard disks that attempt to spin-up simultaneously. Such an occurrence requires a sufficient power supply to withstand this initial demand.

As a solution to the above-described problem, staggered spin-up is implemented in systems where the host system may spin up the disk drives sequentially. Staggered spin-up significantly lowers design requirements and the cost of the power supply, and avoids overloading of the power supply, reducing the risk of damage to the power supply and the disk drives.

In Serial ATA II; extensions to Serial ATA 1.0a, pin 11 of a power segment of a device connector may be used to control whether staggered spin-up should be used on a particular device. When pin 11 is asserted, the device is allowed to spin up immediately after power on. The host can drive pin 11 low to disable staggered spin-up.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for disabling staggered spin-up of hard disk drives coupled to a bridging device is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
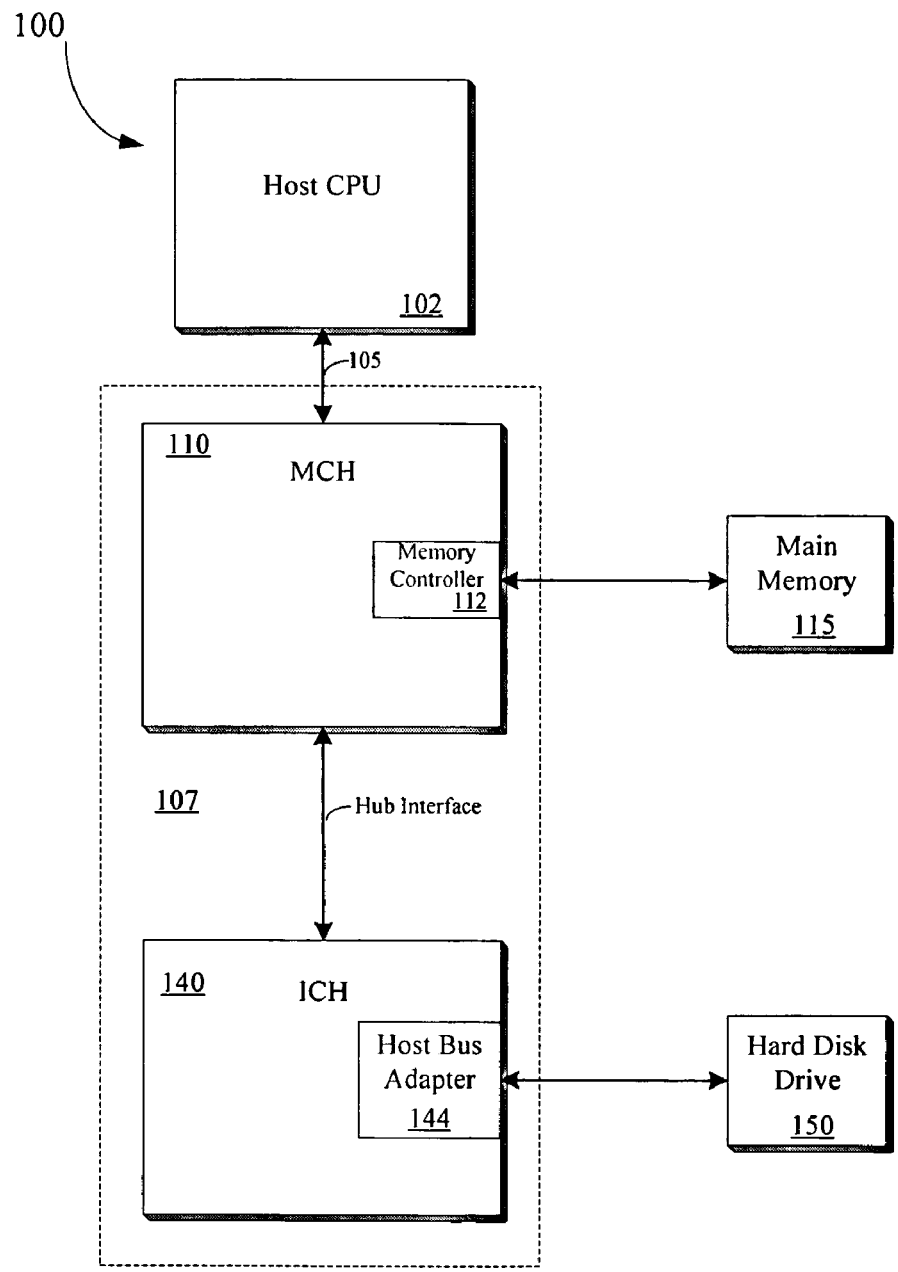
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard disk drives 150. In one embodiment, hard disk drive 150 is a serial SCSI (SAS) drive. However in other embodiments, hard disk drive 150 may be a serial ATA (SATA) drive. Nevertheless, HBA 144 is capable of controlling either a SAS or SATA device, as well as other device types.

For spin-up in a serial SCSI (SSP) drive, the host system (e.g., HBA 144) issues a start-stop unit command (spin-up enable) to enable the device for spin up. However, the device is not allowed to start spinning up until a primitive NOTIFY (enable spin-up) is received. In SATA devices, a device automatically spins up when phy initialization sequence is complete.

Figure 2:
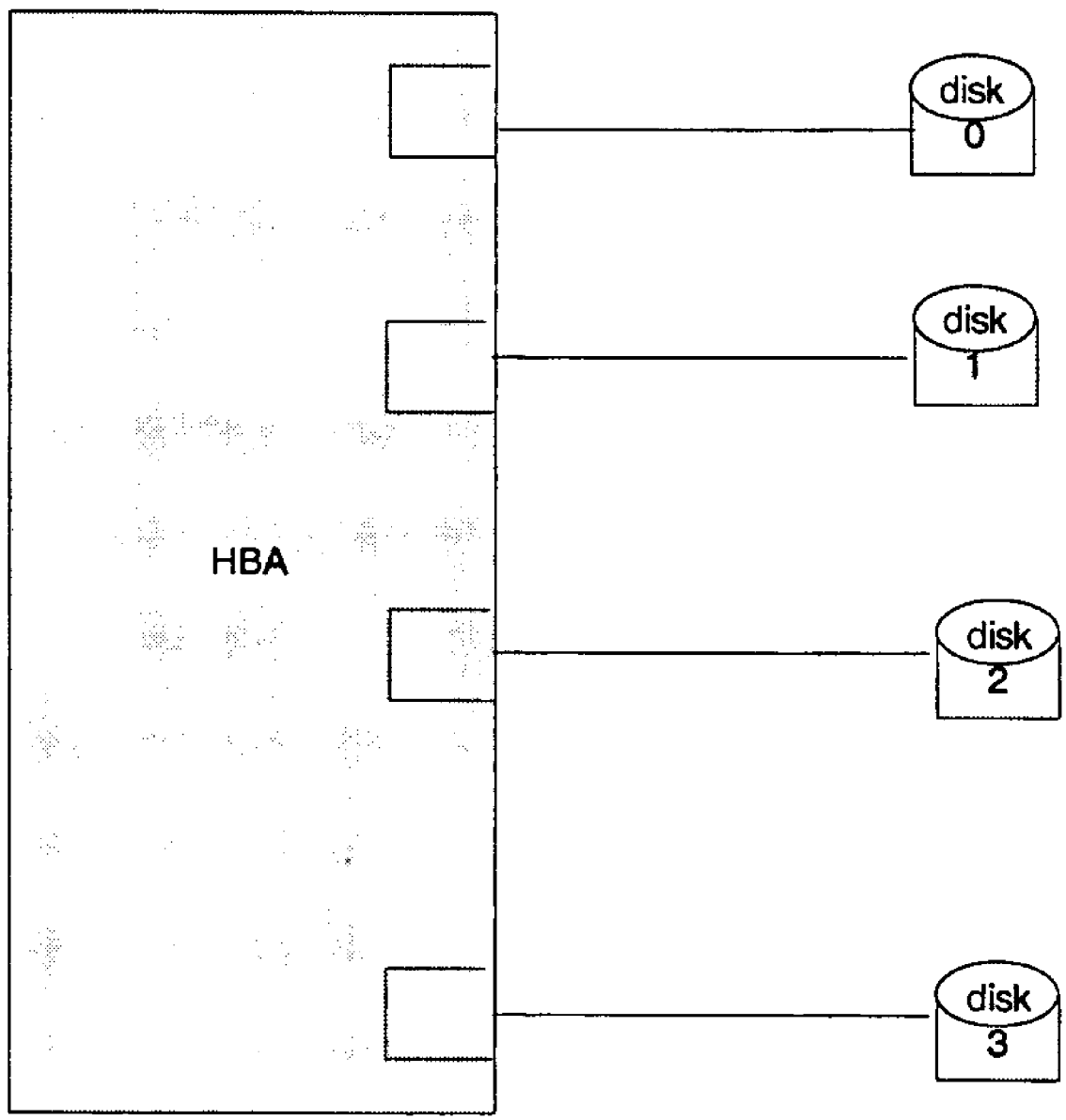
FIG. 2 illustrates one embodiment of a Host Bus Adapter coupled to hard disk drives.

According to one embodiment, HBA 144 enables disk drives coupled to HBA 144 to be started up sequentially. FIG. 2 illustrates one embodiment of an HBA coupled to hard disk drives. As shown in FIG. 2, the HBA is coupled to four storage devices via four ports.

As discussed above, the HBA can spin up the disk drives sequentially in a staggered spin-up enabled system in order to lower the cost of a power supply and to not overload the power supply that possibly results in damage. However, the staggering spin-up feature may not necessarily be useful in systems that do not have power supply issues, or that is to spin up a few devices immediately (e.g. bootdrive). In some systems it may be desirable to spin up disks immediately after power up to get faster disk accesses, dispensing with the latency caused by staggered spin-up.

In Serial ATA, pin 11 of a power segment of a device connector may be used to control whether staggered spin-up should be used on a particular device. When pin 11 is asserted (active low assertion), the device is allowed to spin up immediately after power on. The host (e.g., HBA 144)

can drive pin 11 low to disable staggered spin-up. This can be accomplished in the direct attached case depicted in FIG. 2.

Figure 3:
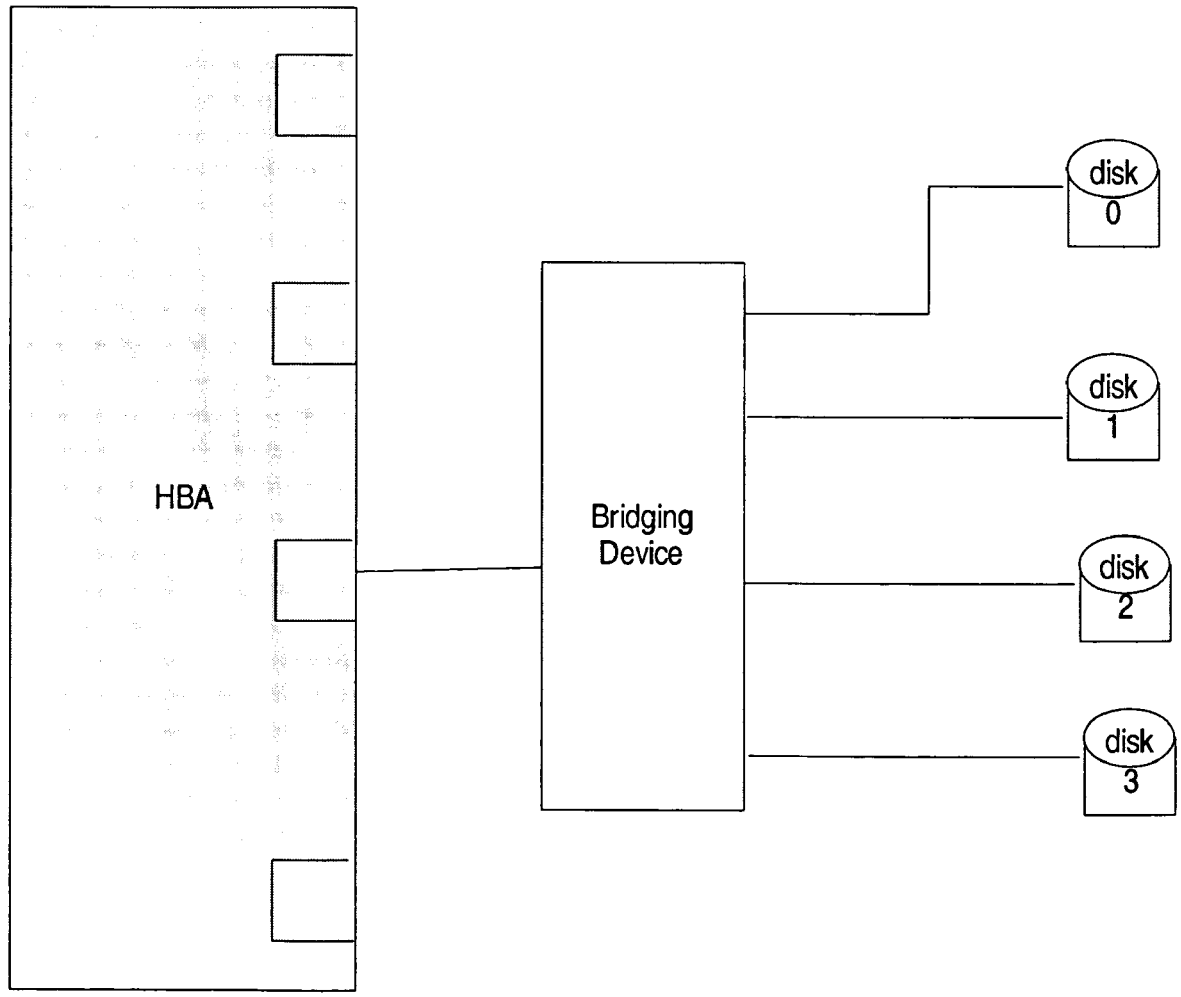
FIG. 3 illustrates one embodiment of a Host Bus Adapter coupled to hard disk drives via a bridging device.

As storage systems become larger, attaching the disks directly to HBA 144 becomes unrealistic. Therefore port multipliers and expanders with built-in STP/SATA bridges are introduced. FIG. 3 illustrates one embodiment of a Host Bus Adapter coupled to hard disk drives via a bridging device.

In FIG. 3, the Host Bus Adapter has 4 phys connects to a bridging device via a phy. The bridging device connects to 4 disk drives. In this configuration, only one phy of the Host Bus Adapter is used to communicate with the 4 disks. The problem with this configuration, however, is that the Host Bus Adapter cannot use pin 11 of the power segment of the device connector to disable staggered spin-up of the disks behind the bridging device.

Figure 4:
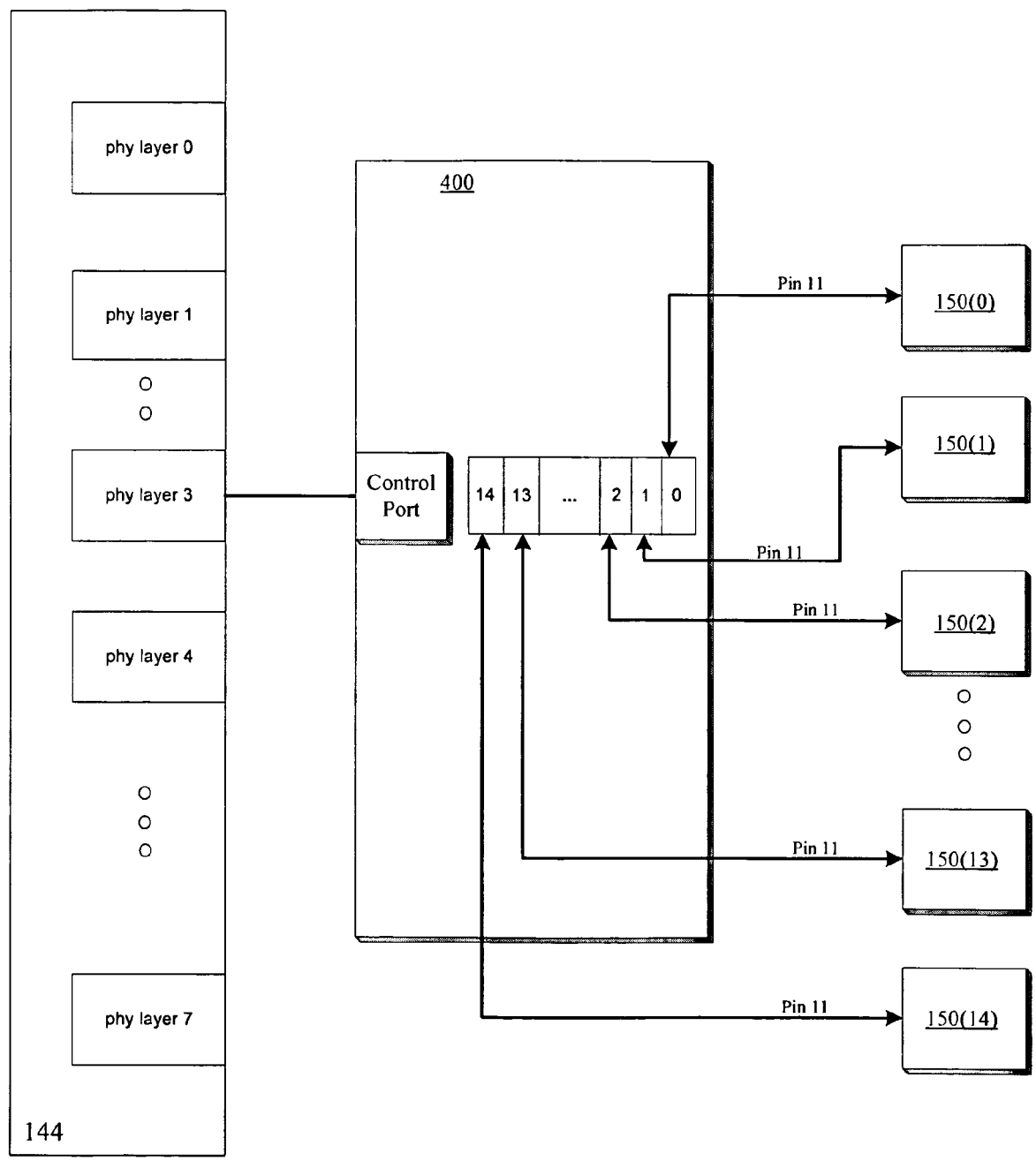
FIG. 4 illustrates another embodiment of a Host Bus Adapter coupled to hard disk drives via a bridging device.

According to one embodiment, a mechanism is provided to communicate with each device coupled to a bridging device in order to disable staggered spin-up in devices coupled to the bridging device. FIG. 4 illustrates one embodiment of HBA 144 coupled to hard disk drives via a bridging device 400 in which HBA 144 may disable staggered spin-up in a particular device.

Referring to FIG. 4, HBA 144 has 8 phys (phy 0–phy 7) connected to a bridging device 400 via phy 3. Bridging device 400 connects to 15 disk drives 150(0)–150(14). According to one embodiment, bridging device 400 is a port multiplier (PM). However, in other embodiments, bridging device 400 may be implemented using other bridging devices such as an expander.

As discussed above, PM 400 is connected to HBA 144 on one side, and 15 different devices on the other side. Within a PM there are user defined registers that are accessible using Read/Write Port Multiplier commands issued to a control port that connects PM 400 to HBA 144. Typically, the registers are used to convey status information and control operation of a port multiplier.

In one embodiment, a user defined register (e.g., USERREG) is used to convey the staggered spin-up enable/disable information from HBA 144 to each of the 15 disk drives behind PM 400. In one embodiment, PM 400 holds its OOB sequence in an idle state upon power up until USERREG is written. For instance, if HBA 144 intends to disable staggered spin-up for disks 150(0)–150(3) and leave the rest of disks enabled for staggered spin-up, HBA 144 will write to the control port of PM 400 and to the USERREG register with the value 7FF0H.

In response, PM 400 detects a write to USERREG and releases its OOB sequence state machine (not shown). Bit 0 to 14 of the register is then used to drive pin 11's of the corresponding devices. For example, since staggered spin-up for disk 150(0) is to be disabled, a logical 0 is written to the register bit corresponding to disk 0. Thus, pin 11 of the power segment of the device 150(0) connector is asserted and disk 150(0) is allowed to spin up immediately. Note that a similar method can be used in an expander. In an expander, HBA 144 may access user defined registers in the STP/SATA bridge of the expander, thus controlling the pin 11 of the power segment for each device. According to one embodiment, the feature implemented within an expander is enabled/disabled through a strap, pin or fuse.

In another embodiment, USERREG register may also be implemented where instead of holding the OOB state machines in reset, PM 400 will let them run on power up. In such an embodiment, the register defaults to 7FFFH, which indicates that staggered spin-up is enabled and the disks should not spin up until they are completed with their OOB/Speed Negotiation sequence. HBA 144 writes a 0 for each of the corresponding bits in USERREG that require immediate spin-up, so these devices can spin up first. The remaining devices should be spun up using the staggered spin-up mechanism.

The above-described staggered spin-up mechanism provides remote SATA device (e.g., attached behind a bridging device) fast disk spin up for earlier disk access in large scalable storage systems.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   one or more storage devices;
   a host bus adapter (HBA);
   a bridging device, coupled between the one or more storage device and the HBA, having a register including bits corresponding to each of the one or more storage devices, each bit indicating whether staggered spin-up is enabled at a corresponding storage device; and
   a first connector, coupled between the bridging device and a first storage device, having a pin that is asserted if a first bit in the register corresponding to the first storage device indicates that staggered spin-up at the first device is to be disabled.

2. The system of claim 1 further comprising a second connector coupled between the bridging device and a second storage device, having a pin that is asserted if a second bit in the register corresponding to the second storage device indicates that staggered spin-up at the second device is to be disabled.

3. The system of claim 2 wherein the pins on the first connector and on the second connector are each a power segment of the first connector and on the second connector.

4. The system of claim 1 wherein the register is a user defined register.

5. The system of claim 4 wherein the bridging device further comprises a control port coupled to the HBA.

6. The system of claim 5 wherein the user defined register is accessible to the HBA using commands issued to the control port.

7. The system of claim 1 wherein the bridging device is a port multiplier.

8. The system of claim 1 wherein the bridging device is an expander.

9. A method comprising:
   storing data in a register at a bridging device having spin-up information for two or more storage devices coupled to the bridging device, the register having bits corresponding to each of the two or more storage devices;
   reading a first bit corresponding to a first storage device to determine if staggered spin-up is enabled for the first storage device; and
   asserting a pin on a first connector coupled to the first storage device if the first bit indicates that staggered spin-up is not enabled.

10. The method of claim 9 further comprising receiving the data at a control port in the bridging device from a Host Bus Adapter (HBA) prior to storing the signal.

11. The method of claim 9 further comprising spinning up the first storage device immediately if the pin on the first connector is asserted.

12. The method of claim 11 further comprising staggering the spin up of the first storage device if the first bit indicates that staggered spin-up is enabled.

13. The method of claim 9 further comprising:
- reading a second bit corresponding to a second storage device to determine if staggered spin-up is enabled for the second storage device; and
- asserting a pin on a second connector coupled to the second storage device if the second bit indicates that staggered spin-up is not enabled.

14. A bridging device comprising:
- a control port to receive data from a Host Bus Adapter (HBA);
- a register having bits corresponding to each of one or more storage devices coupled to the bridging device, each bit indicating whether staggered spin-up is enabled at a corresponding storage device; wherein the bridging device asserts a pin on a first connector to a first storage device if a first bit in the register corresponding to the first storage device indicates that staggered spin-up at the first device is to be disabled.

15. The bridging device of claim 14 wherein the bridging device asserts a pin on a second connector coupled to a second storage if a second bit in the register corresponding to the second storage device indicates that staggered spin-up at the second device is to be disabled.

16. The bridging device of claim 14 wherein the register is a user defined register.

17. The bridging device of claim 16 wherein the user defined register receives commands from the HBA via the control port.

18. The bridging device of claim 17 wherein the bridging device is a port multiplier.

* * * * *

UNITED STATES PATENT AND TRADEMARK OFFICE
CERTIFICATE OF CORRECTION

| | | |
|---|---|---|
| PATENT NO. | : 7,221,531 B2 | Page 1 of 1 |
| APPLICATION NO. | : 11/224378 | |
| DATED | : May 22, 2007 | |
| INVENTOR(S) | : Duerk et al. | |

It is certified that error appears in the above-identified patent and that said Letters Patent is hereby corrected as shown below:

In column 6, at line 3, after "connector" insert --coupled--.

Signed and Sealed this

Twenty Second Day of April, 2008

JON W. DUDAS
*Director of the United States Patent and Trademark Office*